United States Patent
Dutton et al.

(10) Patent No.: US 10,333,626 B2
(45) Date of Patent: Jun. 25, 2019

(54) DEVICES AND METHODS FOR TRANSMITTING AND RECEIVING IN AN OPTICAL COMMUNICATIONS SYSTEM

(71) Applicant: STMICROELECTRONICS (RESEARCH & DEVELOPMENT) LIMITED, Marlow (GB)

(72) Inventors: Neale Dutton, Edinburgh (GB); Denise Lee, Edinburgh (GB); Graeme Storm, Kirkliston (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 0 days.

(21) Appl. No.: 16/108,257

(22) Filed: Aug. 22, 2018

(65) Prior Publication Data

US 2019/0013873 A1    Jan. 10, 2019

Related U.S. Application Data

(62) Division of application No. 15/360,220, filed on Nov. 23, 2016, now Pat. No. 10,079,643.

(51) Int. Cl.
| | |
|---|---|
| H04B 10/00 | (2013.01) |
| H04B 10/516 | (2013.01) |
| H04B 10/114 | (2013.01) |
| H04B 10/66 | (2013.01) |
| H04B 10/50 | (2013.01) |
| H04B 10/58 | (2013.01) |
| H04B 10/61 | (2013.01) |

(52) U.S. Cl.
CPC ....... *H04B 10/5161* (2013.01); *H04B 10/114* (2013.01); *H04B 10/502* (2013.01); *H04B 10/503* (2013.01); *H04B 10/58* (2013.01); *H04B 10/61* (2013.01); *H04B 10/66* (2013.01)

(58) Field of Classification Search
USPC ............................................. 398/25–38, 158
See application file for complete search history.

(56) References Cited

U.S. PATENT DOCUMENTS

| | | | | |
|---|---|---|---|---|
| 6,721,512 B1 * | 4/2004 | Cao | ................. | H04B 10/25077 398/147 |
| 6,753,958 B2 * | 6/2004 | Berolo | ................. | G01J 3/0259 356/328 |
| 7,006,765 B2 * | 2/2006 | Hendow | ................. | G01J 3/36 398/14 |
| 7,130,505 B2 * | 10/2006 | Shen | ................. | G02B 6/12019 385/24 |
| 7,457,032 B2 * | 11/2008 | Qiao | ............... | H04B 10/07953 359/333 |
| 7,636,525 B1 * | 12/2009 | Bontu | ................... | H04B 10/60 398/208 |
| 8,699,529 B2 * | 4/2014 | Budianu | ................. | H04B 1/76 370/210 |
| 8,965,211 B1 * | 2/2015 | Zanoni | ................. | H04B 10/61 341/137 |
| 10,079,643 B2 * | 9/2018 | Dutton | ................ | H04B 10/114 |

(Continued)

*Primary Examiner* — Agustin Bello
(74) *Attorney, Agent, or Firm* — Slater Matsil, LLP

(57) ABSTRACT

An embodiment device includes an optical source configured to generate an optical carrier including an optical pulse train; and a modulator configured to modulate an amplitude of the optical pulse train, based on data generated by a data source, to produce a modulated optical signal.

20 Claims, 12 Drawing Sheets

(56) References Cited

U.S. PATENT DOCUMENTS

| | | | | |
|---|---|---|---|---|
| 2003/0011837 A1* | 1/2003 | Shake | H04B 10/07951 | 398/5 |
| 2005/0008369 A1* | 1/2005 | Winzer | H04B 10/60 | 398/83 |
| 2005/0207583 A1* | 9/2005 | Christoph | H03G 3/32 | 381/57 |
| 2006/0153498 A1* | 7/2006 | Shen | G02B 6/12019 | 385/24 |
| 2007/0065147 A1* | 3/2007 | Qiao | H04B 10/07953 | 398/26 |
| 2010/0214259 A1* | 8/2010 | Philipp | G06F 3/0416 | 345/174 |
| 2011/0249185 A1* | 10/2011 | Elsherif | H04N 5/211 | 348/572 |
| 2011/0293276 A1* | 12/2011 | Takahara | H04B 10/5053 | 398/65 |
| 2015/0138507 A1* | 5/2015 | Thomsen | G02F 1/35 | 351/221 |
| 2015/0222354 A1* | 8/2015 | Shang | H04B 10/0775 | 398/26 |
| 2015/0309616 A1* | 10/2015 | Stern | G06F 3/044 | 345/174 |
| 2015/0341138 A1* | 11/2015 | Ishihara | H04B 10/25133 | 398/35 |
| 2016/0013863 A1* | 1/2016 | Dou | H04B 10/07953 | 398/32 |
| 2017/0063452 A1* | 3/2017 | Shirai | H04B 10/079 | |
| 2017/0359127 A1* | 12/2017 | Moeller | H04B 10/532 | |
| 2018/0145762 A1* | 5/2018 | Dutton | H04B 10/114 | |
| 2019/0013873 A1* | 1/2019 | Dutton | H04B 10/114 | |

\* cited by examiner

DEVICES AND METHODS FOR TRANSMITTING AND RECEIVING IN AN OPTICAL COMMUNICATIONS SYSTEM

CROSS-REFERENCE TO RELATED APPLICATIONS

This application is a divisional of U.S. patent application Ser. No. 15/360,220, filed Nov. 23, 2016, which application is hereby incorporated herein by reference.

TECHNICAL FIELD

The present disclosure relates generally to optical communications systems, and, in particular embodiments, to devices and methods for transmitting and receiving in an optical communications system.

BACKGROUND

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free-space and therefore do not require the routing of cables or fibers between locations. In a typical free-space optical communications system, a modulated beam of light is directed through free-space from a transmitter at a first location to a receiver at a second location. Data or information is encoded into the beam of light by means of the modulation. Once collected by the receiver, the modulated beam of light is demodulated and corresponding data and information may then be extracted. This scheme enables data and information to be transmitted through free-space from the first location to the second location.

Transmission of optical signals through free space poses many challenges. Notably, optical communications systems operating in free-space are subject to ambient light and interference from other optical communication systems, which can both manifest as a moving baseline that detrimentally affects performance of an optical communications system. As such, there may be a need for optical carriers and modulation schemes (e.g. at the transmitter), and optical detection methods and demodulation schemes (e.g. at the receiver), to compensate for the effects of the interference and ambient light on a signal received at a receiver.

SUMMARY

In an embodiment, a device includes an optical source configured to generate an optical carrier including an optical pulse train; and a modulator configured to modulate an amplitude of the optical pulse train, based on data generated by a data source, to produce a modulated optical signal.

In an embodiment, a device includes an optical detector configured to generate an output signal in response to a modulated optical signal detected at the optical detector, wherein the modulated optical signal includes an optical pulse train having amplitudes modulated by data. The device further includes a data detection circuit configured to sample the output signal during a first window of time, the data detection circuit being configured to estimate the data. The device additionally includes a noise estimation circuit configured to sample the output signal during a second window of time different from the first window of time, the noise estimation circuit being configured to determine an ambient noise estimate.

In an embodiment, a method includes generating, using an optical source, an optical pulse train; modulating an amplitude of the optical pulse train, based on data generated by a data source, to produce a modulated optical signal; and transmitting the modulated optical signal. The method further includes generating, using an optical detector, an output signal in response to the modulated optical signal being detected at an optical detector; sampling the output signal during a first window of time to estimate the data; and sampling the output signal during a second window of time different from the first window of time to determine an ambient noise estimate.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Figure 1:
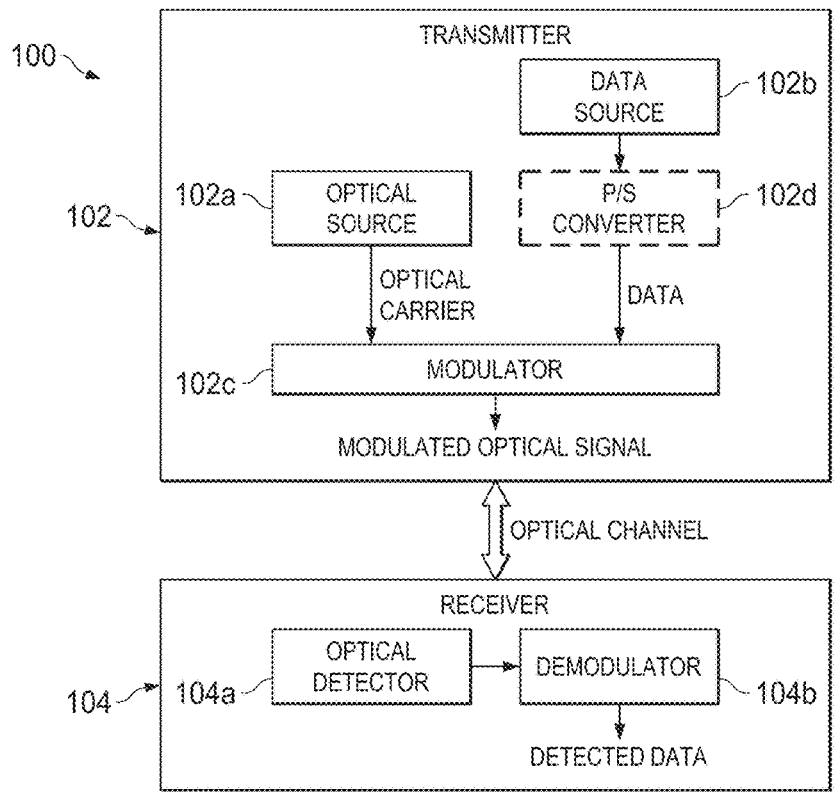
FIG. 1 shows a simplified block diagram of an optical communications system including a transmitter and a receiver, in accordance with an embodiment.

FIG. 1 shows a simplified block diagram of an optical communications system 100, in accordance with an embodiment. The optical communications system wo includes a transmitter 102 and a receiver 104. In some embodiments, the optical communications system 100 may be a light-fidelity (Li-Fi) communications system that uses visible light for communication between the transmitter 102 and the receiver 104. Additionally or alternatively, the optical communications system 100 may use non-visible light, such as infrared or ultraviolet light, for communication between the transmitter 102 and the receiver 104.

The optical communications system 100 may be a near-field communications (NFC) system. As an example, the transmitter 102 and the receiver 104 may each be included in respective customer devices (e.g. a mobile device, an NFC reader, combinations thereof, or the like). In such embodiments, the optical communications system 100 may be used for point-to-point communications (e.g. secure transactions) between the respective customer devices.

The optical communications system 100 may, additionally or alternatively, be a high speed data transmission system that facilitates data exchange between the respective customer devices (e.g. between mobile devices). In some embodiments, the optical communications system 100 may facilitate data exchange between a customer device and a base station. For example, the transmitter 102 may be included in a customer device or a base station, while the receiver 104 may be included in the other of the customer device or the base station. Such an embodiment may allow for high speed data transfer between the customer device (e.g. a mobile device) and the base station, an example being data download from a base station to the customer device.

The optical communications system 100 may further be used for time-of-flight (ToF) ranging for various applications such as autofocus, proximity sensing, and object detection in robotics, drone technology, and internet-of-things (IoT) applications. As such, in some embodiments, the optical communications system 100 may support both time-of-flight ranging and one or more of the aforementioned data exchange communications systems. In embodiments where the optical communications system 100 is also used for time-of-flight (ToF) ranging, the transmitter 102 and the receiver 104 may each be included in a proximity sensor of a customer device that supports ToF detection and distance resolution in addition to data exchange.

As depicted in FIG. 1, the transmitter 102 may include an optical source 102a, a data source 102b, and a modulator 102c. The optical source 102a may be configured to generate an optical carrier. In some embodiments, the optical source 102a may include one or more laser diodes that emit light (e.g. infrared or visible light) in response to a control signal provided to the one or more laser diodes. In some embodiments, the optical carrier generated by the optical source 102a may be a short duty cycle pulse train, as discussed below in respect of FIG. 3. In some embodiments, the optical source 102a may include vertical-cavity surface-emitting lasers (VCSELs), quantum well lasers, quantum cascade lasers, interband cascade lasers, and vertical external-cavity surface-emitting lasers (VECSELs), although other types of optical sources may be possible in other embodiments. In an embodiment where the optical source 102a includes a plurality of laser diodes, the plurality of laser diodes may be arranged in an array of laser diodes. In some embodiments, the optical source 102a may include a light-emitting diode (LED).

The data source 102b of the transmitter 102 provides data for transmission to the receiver 104. In some embodiments, the transmitter 102 may include a serializer or a parallel/serial (P/S) converter 102d for receiving data from the data source 102b on a plurality of parallel lines. In such embodiments, the P/S convertor 102d provides serial data to the modulator 102c. As depicted in FIG. 1, the modulator 102c receives the optical carrier from the optical source 102a. The transmitter 102 may include one or more drivers (not shown in FIG. 1) coupled to at least one of the optical source 102a, the data source 102b, the modulator 102c, or, in some embodiments, the P/S convertor 102d. The one or more drivers may be configured to drive the modulator 102c to modulate an intensity of the optical carrier generated by the optical source 102a based on the data received from the data source 102b (e.g. in a pulse amplitude modulation (PAM) scheme). In some embodiments, the one or more drivers may be configured to drive the modulator 102c to modulate in-phase and/or quadrature components of one or both polarizations of the optical carrier based on the data received from the data source 102b (e.g. in a quadrature amplitude modulation (QAM) scheme or an orthogonal frequency division multiplexing (OFDM) scheme). The modulator 102c may be configured to perform other modulation schemes, examples being time division multiplexing and wavelength division multiplexing (which is analogous to frequency division multiplexing in radio-frequency communication systems). In some embodiments, the modulator 102c may modulate the data generated by the data source 102b using a PAM modulation scheme, as discussed below in respect of FIG. 3. Following the modulation, the modulator 102c outputs a modulated optical signal that is transmitted over an optical channel that communicatively links the receiver 104 and the transmitter 102. A transmitter front end (not shown in FIG. 1 for simplicity) may facilitate the transmission of the modulated optical signal from the transmitter 102 to the receiver 104.

The receiver 104 receives the modulated optical signal that is transmitted by the transmitter 102 and carried by the optical channel. The receiver 104 includes an optical detector 104a and a demodulator 104b. The optical detector 104a may be configured to convert the modulated optical signal received at the receiver 104 into an electrical pulse. In an embodiment, the optical detector 104a includes one or more photo diodes (PDs), one or more avalanche photo diodes (APDs), one or more single-photon avalanche diodes (SPADs), or a combination thereof. The optical detector 104a may produce a digital pulse output or an analog pulse output, depending on the circuitry of the optical detector 104a. Circuitries of the optical detector 104a that respectively produce a digital pulse output and an analog pulse output are discussed in detail below in respect of FIGS. 6A and 6B.

The output of the optical detector 104a is an electrical pulse that is subsequently provided to the demodulator 104b. The demodulator 104b may be configured to receive the electrical pulse from the optical detector 104a and to detect the data generated by the data source 102b at the transmitter 102 and transmitted to the receiver 104. The demodulator 104b may include one or more amplifiers, electrical filters, decision circuits, or a combination thereof. The specific circuitry of the receiver 104 may depend, at least in pail, on the modulation scheme used by the modulator 102c, the optical carrier generated by the optical source 102a, and on whether the optical detector 104a produces a digital pulse output or an analog pulse.

The optical channel between the transmitter 102 and the receiver 104 may be free-space that is subject to various sources of noise that may not be present in optical fiber communications. As an example, in free-space communication, ambient light is a major source of noise, and ambient noise sources may include sunlight, background illumination sources (e.g. bulbs), or both. Free-space communication also suffers from interference from other transmissions, such as ToF interference in embodiments where the transmitter 102 and receiver 104 are also used for ToF detection and distance resolution. The effect of ambient noise on the modulated optical signal of FIG. 1 is illustrated in FIG. 2.

Figure 2:
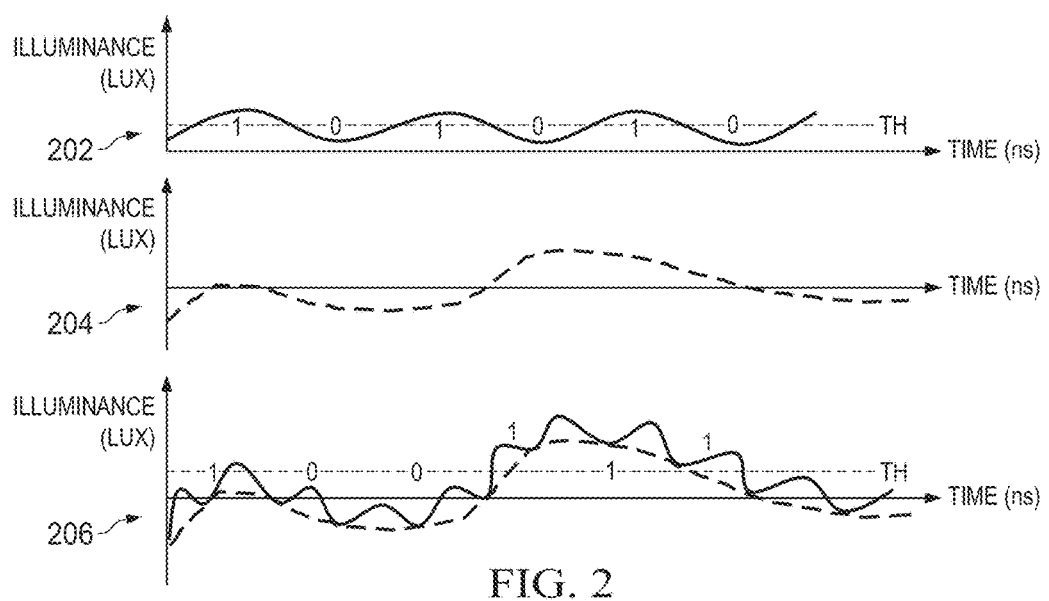
FIG. 2 shows an illustration of a modulated optical signal, ambient noise, and a received signal, which is a superposition of the modulated optical signal and the ambient noise.

FIG. 2 shows an illustration of a modulated optical signal 202, ambient noise 204, and a received signal 206, which is a superposition of the modulated optical signal 202 and the ambient noise 204. The vertical axis of each of the illustrations in FIG. 2 denotes illuminance (e.g. measured in lux or an equivalent unit denoting received optical power), while the horizontal axis of each of the illustrations denotes time (e.g. measured in nanoseconds). The modulated optical signal 202 contains data generated by the data source 102b, and as shown in the example of FIG. 2, the data stream 101010 modulates the amplitude of a continuously varying carrier signal (e.g. relative to a threshold TH) to produce the modulated optical signal 202. For example, a modulation scheme is used where the bit 0 of the data stream is transmitted as an amplitude below the threshold TH and where the bit 1 of the data stream is transmitted as an amplitude above the threshold TH.

As depicted in FIG. 2, the ambient noise 204 present in the optical channel between the transmitter 102 and the receiver 104 adds a moving baseline to the modulated optical signal 202. In many instances, the ambient noise 204 varies with time and is different for each symbol period or bit period of the modulated optical signal 202. The signal received at the receiver 104 is the superposition of the modulated optical signal 202 and the ambient noise 204, and this is depicted in FIG. 2 as the received signal 206. As shown in the illustration of FIG. 2, the moving baseline contributed by the ambient noise 204 may cause detection errors in the receiver 104. For example, comparing the received signal 206 against the threshold TH would lead the demodulator 104b to determine that the transmitted data stream is 100111, thereby causing a significant bit error rate (BER). In view of the illustration in FIG. 2, there may be a need to provide a system and a method that compensates for ambient noise 204 received at the receiver 104 such that robust communications (e.g. having low BER and minimal inter-symbol interference) may occur between the transmitter 102 and the receiver 104 of the optical communications system 100. In particular, there may be a need for an appropriate optical carrier and a suitable modulation scheme at the transmitter 102 so that the modulated optical signal 202 sent by the transmitter 102 is robust against the ambient noise 204. Related to this, there may also be a need for suitable circuitry in the optical detector 104a and a suitable ambient noise compensation technique at the demodulator 104b so that the performance of the optical communications system 100 is maximized (e.g. in terms of low bit error rate (BER) and minimal inter-symbol interference (ISI)).

Figure 3:
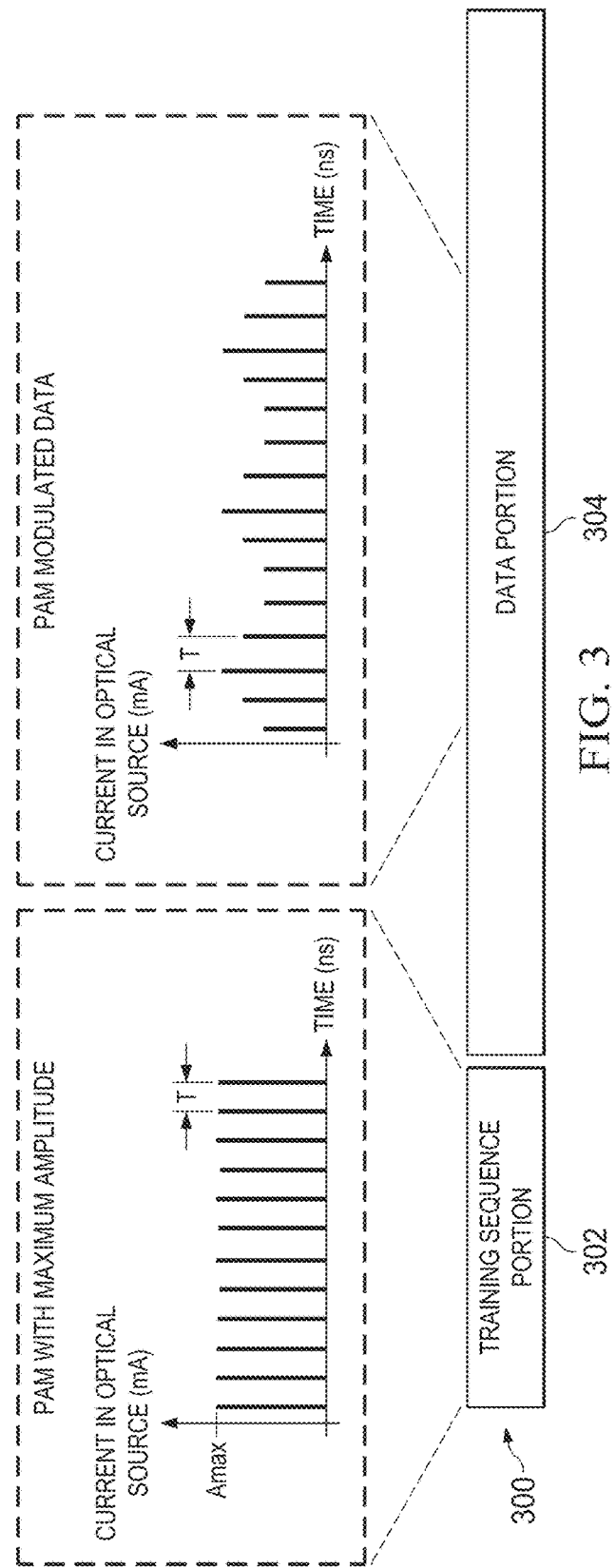
FIG. 3 shows a modulated optical signal that illustrates an optical carrier and a modulation scheme implemented at the transmitter of the optical communications system in FIG. 1, in accordance with an embodiment.

FIG. 3 shows an optical carrier and a modulation scheme implemented at the transmitter 102, in accordance with an embodiment. The optical carrier and the modulation scheme illustrated in FIG. 3 (and which is described in greater detail below) provides a modulated optical signal 300. The transmitter 102 of the optical communications system 100 transmits the modulated optical signal 300 to the receiver 104, as an example. The optical carrier and the modulation scheme used for the modulated optical signal 300 allow for robust communications between the transmitter 102 and the receiver 104. The vertical axis in FIG. 3 denotes current in the optical source 102a (e.g. measured in mA), while the horizontal axis denotes time (e.g. measured in ns). In some embodiments, the current flowing in the optical source 102a may be proportional to the illuminance of the light generated by the optical source 102a.

The modulated optical signal 300 includes a first portion 302, which may be identified as a training sequence portion. The modulated optical signal 300 also includes a second portion 304, which may be identified as a data portion. In some embodiments, the data generated by the data source 102b is contained within the second portion 304 of the modulated optical signal 300. In some data streams, especially in high-speed serial data streams, transmissions from the transmitter 102 to the receiver 104 are devoid of an accompanying clock signal. In such embodiments, the receiver 104 may need to generate a clock from an approximate frequency reference, and then phase-align the generated clock to the transitions in the data stream with a phase-locked loop (PLL). This is commonly known as clock and data recovery (CDR). In essence, CDR allows the receiver 104 to lock onto data contained within the modulated optical signal 300 (e.g. lock onto data contained in the second portion 302 of the modulated optical signal 300). The first portion 302 of the modulated optical signal 300 allows the receiver 104 to perform CDR. This is described in greater detail below in respect of FIG. 10.

As depicted in FIG. 3, the optical carrier generated by the optical source 102a of the transmitter 102 may be a short duty cycle pulse train. Also as depicted in FIG. 3, the modulator 102c of the transmitter 102 may implement a PAM modulation scheme for both the first portion 302 and the second portion 304 of the modulated optical signal 300. As such, the amplitude of each pulse of the optical carrier (e.g. the short duty cycle pulse train) may be modulated by the data generated by the data source 102b. The number of possible amplitudes in a PAM modulation scheme may be some power of two. For example, in 4-level PAM there are $2^2$ possible discrete pulse amplitudes; in 8-level PAM there are $2^3$ possible discrete pulse amplitudes; and in 16-level PAM there are $2^4$ possible discrete pulse amplitudes. In each of these examples, the maximum discrete pulse amplitude is denoted as $A_{MAX}$, while the minimum discrete pulse amplitude is denoted as $A_{MIN}$. In some embodiments, the minimum amplitude $A_{MIN}$ of a pulse of the short duty cycle pulse train is greater than zero.

For the first portion 302 of the modulated optical signal 300, the amplitude of each pulse of the short duty cycle pulse train is set to the maximum amplitude $A_{MAX}$. The first portion 302 is generated and transmitted from the transmitter 102 to the receiver 104 at initialization of the optical communications system 100. Setting the amplitude of each pulse in the first portion 302 of the modulated optical signal 300 to the maximum amplitude $A_{MAX}$ and transmitting the first portion 302 at initialization allows the receiver 104 to easily perform CDR prior to the reception of the data-carrying portion (e.g. the second portion 304) of the modulated optical signal 300. The CDR performed by the receiver 104 is discussed in greater detail below in respect of FIG. 10.

Figure 4:
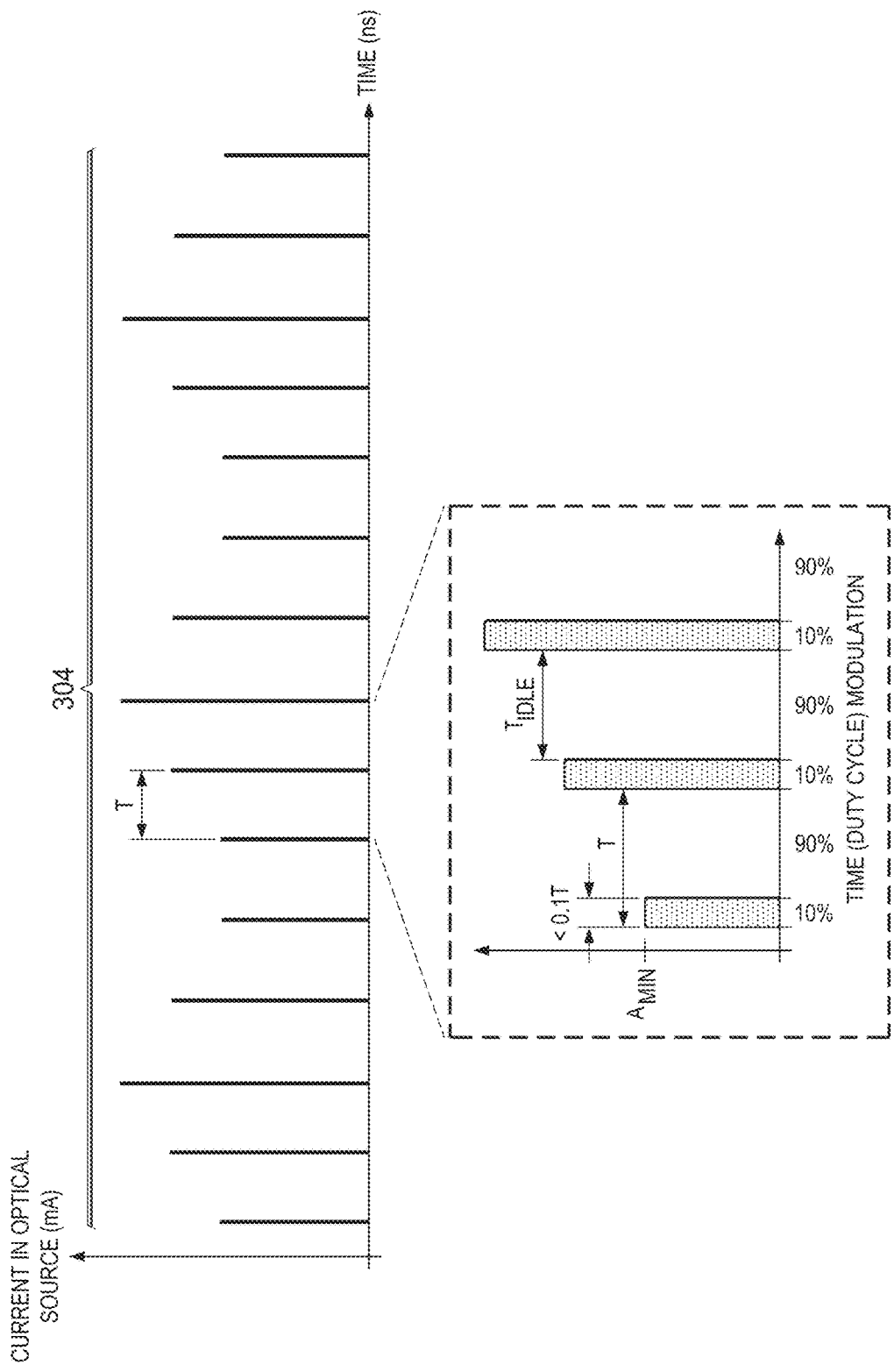
FIG. 4 shows an enlarged view of a portion of a data-carrying portion of the modulated optical signal shown in FIG. 3, in accordance with an embodiment.

FIG. 4 shows an enlarged view of a portion of the second portion 304 of the modulated optical signal 300 in FIG. 3, in accordance with an embodiment. As shown in the example of FIG. 4, the short duty cycle pulse train generated by the optical source 102a of the transmitter 102 may have a duty cycle of less than or equal to about 10 percent. For example, in an optical communications system 100 where data rates are greater than or equal to about 100 Mbps, a period T (indicated in FIGS. 3 and 4) of the optical carrier (e.g. the short duty cycle pulse train) may be less than or equal to about 10 ns. However, in each period of the pulse train, the optical source 102a may be active or turned on for less than or equal to about 10 percent of the period (e.g. for less than or equal to about 1 ns). In doing so, the optical source 102a generates a short duty cycle pulse train as the optical carrier. The short duty cycle pulse train and the PAM modulation scheme depicted in FIGS. 3 and 4 can maximize peak power but maintain the same average power required for laser-safe optical communications. For example, 10 times higher optical power is present in a short pulse with a 10 percent duty cycle. The effects of having the optical source 102a generate the short duty cycle pulse train as the optical carrier and having the modulator 102c implement a PAM modulation scheme are illustrated in FIG. 5.

Figure 5:
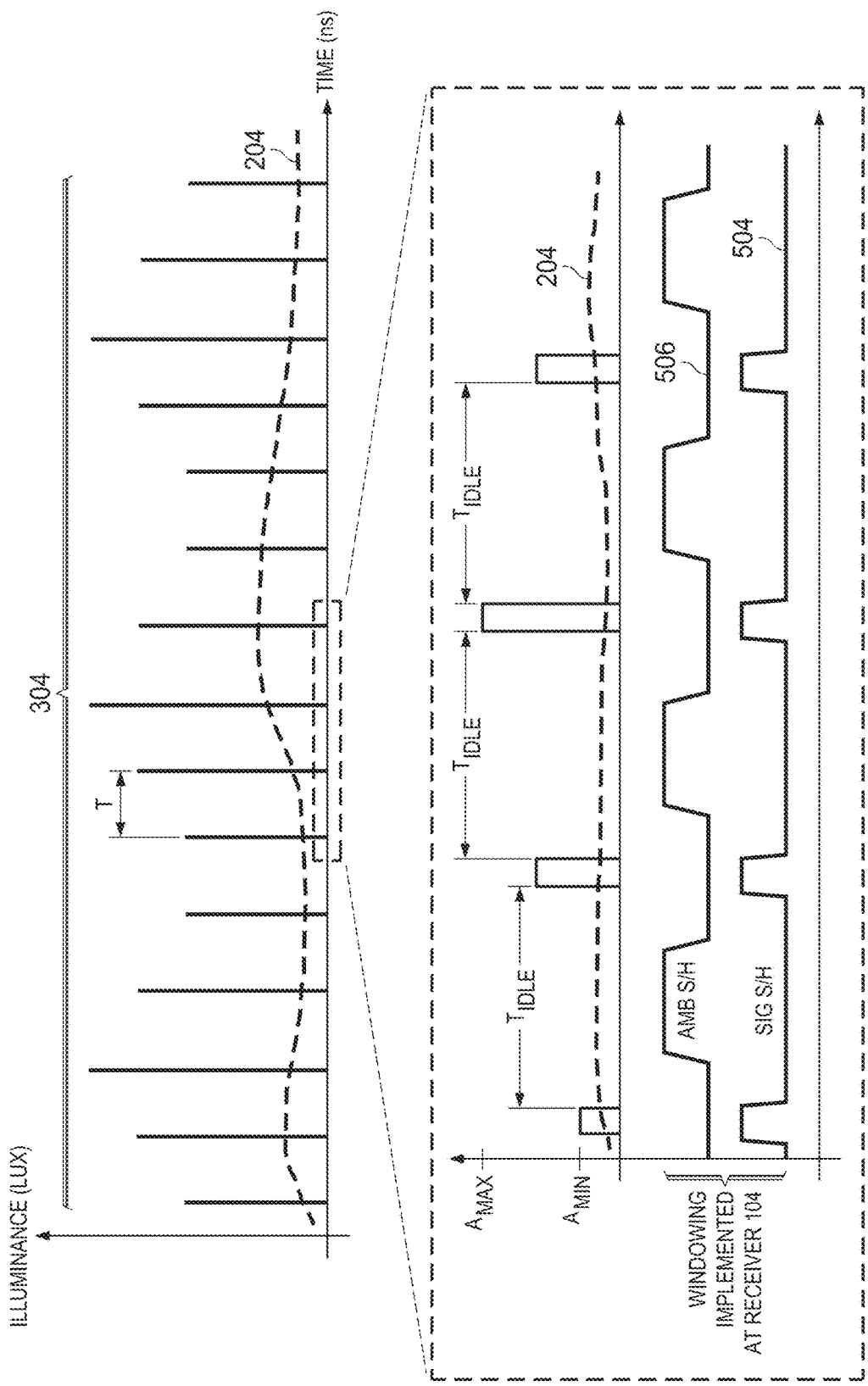
FIG. 5 shows the data-carrying portion of the modulated optical signal shown in FIG. 4 and ambient noise plotted on a common axis, in accordance with an embodiment.

FIG. 5 shows an example of the second portion 304 of the modulated optical signal 300 and ambient noise 204 plotted on a common axis, in accordance with an embodiment. The vertical axis in FIG. 5 denotes illuminance (e.g. measured in lux), while the horizontal axis denotes time (e.g. measured in ns). As shown in FIG. 5, an effect of having the optical source 102a generate the short duty cycle pulse train is that PAM modulated optical signal 300 received at the receiver 104 includes sharp edges that occur every T nanoseconds, even in the presence of ambient noise 204. The occurrence of defined peaks and edges in the PAM modulated optical signal 300 allows for robust CDR by the receiver 104 even in the presence of ambient noise 502. This robust CDR may also be performed using the second portion 304 (e.g. the data-carrying portion) of the PAM modulated optical signal 300. This robust CDR may even be performed when a string of zeros are received at the receiver 104 since the symbol o is encoded with a non-zero minimum amplitude $A_{MIN}$ that may be larger than the amplitude of ambient noise 204 (e.g. due to the high peak power of the short duty cycle pulse train).

Another effect of having the optical source 102a generate the short duty cycle pulse train is that the time period between a falling edge of one pulse of the pulse train and a rising edge of a consecutive pulse of the pulse train (indicated in FIG. 5 as idle time $T_{IDLE}$) is devoid of PAM modulated pulses 304. Thus, the idle time $T_{IDLE}$ between consecutive PAM modulated pulses 304 can be used by the receiver 104 to accurately estimate ambient noise 204 in each period T without having to interrupt communication of PAM modulated pulses 304 from the transmitter 102 to the receiver 104. As such, transmission between the transmitter 102 and the receiver 104 is continuous and ambient tracking is simultaneous to data transmission. The receiver 104 can use this estimate of the ambient noise 204 to compensate for its contribution to the PAM modulated pulses 304. Illustratively, as shown in FIG. 5, the receiver 104 can implement signal windows 504 (e.g. data detection windows) where the demodulator 104b samples the PAM modulated pulses 304 that contain the data generated by the data source 102b. The receiver 104 can also implement ambient windows 506 (e.g. noise estimation windows) where the demodulator 104b samples and estimates the ambient noise 204. By virtue of the fact that the idle times $T_{IDLE}$ and the PAM modulated pulses 304 do not overlap in time, the receiver 104 may be configured to generate the ambient windows 506 and the signal windows 504 such that they do not overlap in time, as depicted in the illustration of FIG. 5.

A further effect provided by the fact that the short duty cycle pulse train has a duty cycle of less than or equal to about 10 percent and the fact that the ambient windows 506 and the signal windows 504 do not overlap in time is that the high frequency at which the sample-and-hold circuits at the receiver 104 are driven may not be needed for analog-to-digital convertors (ADCs) included in the receiver 104. Instead, the ADC convertors may be driven at a recovered clock rate that is lower than the front-end high frequency sample-and-hold rates. This, in turn, leads to higher ADC resolution. This feature is explained in greater detail below in respect of FIG. 10.

Yet another effect of having the optical source 102a generate the short duty cycle pulse train is that the higher peak power of the optical carrier allows for communication between the transmitter 102 and the receiver 104 over larger distances. Additionally, having the optical source 102a generate the short duty cycle pulse train may lead to reduced duty cycle transmission at the transmitter 102 and reduced duty cycle reception at the receiver 104. This, in turn, can result in lower power consumption in both the optical source 102a of the transmitter 102 and the optical detector 104a of the receiver 104.

Figure 6A:
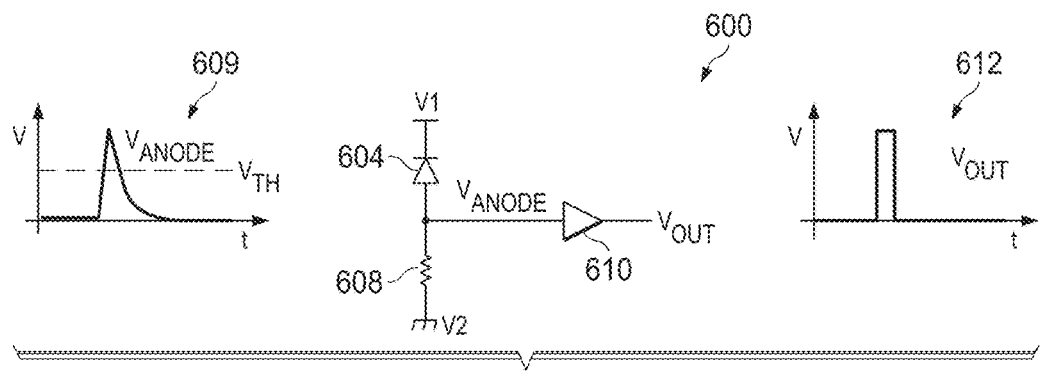
FIG. 6A shows a single-photon avalanche diode (SPAD) optical detector that produces a digital output, in accordance with an embodiment.
Figure 6B:
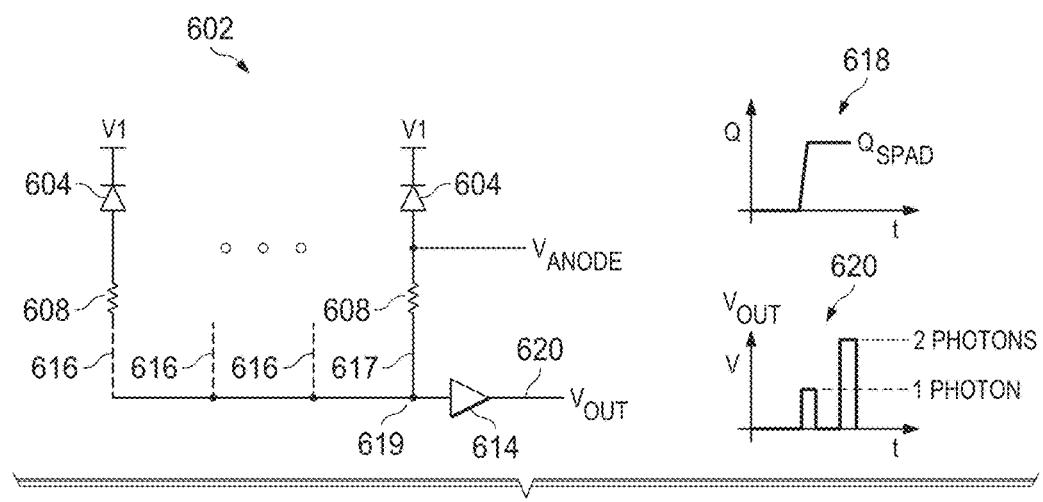
FIG. 6B shows an SPAD optical detector that produces an analog output, in accordance with an embodiment.

Focusing now on the receiver 104 of the optical communications system 100, as described above in relation to FIG. 1, the specific circuitry of the receiver 104 may depend, at least in part, on the modulation scheme used by the modulator 102c, the optical carrier generated by the optical source 102a, and on whether the optical detector 104a produces a digital pulse output or an analog pulse. The receiver 104 includes an optical detector 104a. In some embodiments, the optical detector 104a includes one or more SPADs that may produce a digital output or an analog output. FIG. 6A shows an SPAD optical detector 600 that produces a digital output, in accordance with an embodiment. FIG. 6B shows an SPAD optical detector 602 that produces an analog output, in accordance with an embodiment.

Referring first to FIG. 6A where a digital output is generated by the optical detector 104a, the SPAD optical detector 600 may include a SPAD 604 having a first terminal (e.g. a cathode) coupled to a first reference voltage V1 and a second terminal (e.g. an anode) coupled to a second reference voltage V2 (e.g. ground) via a resistive element 608. In some embodiments, the resistive element 608 may be an active resistor (or transistor) realized using CMOS technology. The SPAD 604 is essentially a diode that is reverse-biased at a voltage (e.g. the potential difference between voltages V1 and V2) that exceeds a breakdown voltage of a p-n junction of the SPAD 604. As such, the electric field within the SPAD 604 is sufficiently high such that a single photon injected into a depletion layer of the SPAD 604 can trigger a self-sustaining current avalanche that is quenched when the reverse-biased voltage across the SPAD 604 drops below the breakdown voltage of the SPAD 604. In the arrangement shown in FIG. 6A, the resistive element 608 may be used to quench the avalanche current in the SPAD 604. In FIG. 6A, the avalanche current quenches because it flows through the resistive element 608 and develops a voltage drop across the resistive element 608, thereby bringing the voltage across the SPAD 604 below the breakdown voltage of the SPAD 604. After quenching the avalanche current, the voltage across the SPAD 604 slowly recovers to a value that exceeds the breakdown voltage, and therefore the SPAD 604 is ready to be ignited again.

As depicted in curve 609 of FIG. 6A, upon detection of a photon, the analog voltage at the second terminal of the SPAD 604 (e.g. measured relative to the second reference voltage V2) rapidly increases due to the avalanche current that flows through the resistive element 608. The SPAD optical detector 600 also includes an amplifier 610 that is configured to output a digital pulse 612, for example, when the analog voltage at the second terminal of the SPAD 604 exceeds a predetermined threshold $V_{TH}$. Since the digital pulse 612 is output at the time the analog voltage at the second terminal of the SPAD 604 exceeds the predetermined threshold $V_T$, the digital pulse 612 contains information that is indicative of a time the photon is detected by the SPAD 604. For example, the time the digital pulse 612 transitions from a low amplitude to a high amplitude may be indicative or the time the photon is detected by the SPAD 604.

Referring first to FIG. 6B where an analog output is generated by the optical detector 104a, the SPAD optical detector 602 may include the SPAD 604 and the resistive element 608 arranged along a branch 617, as described above in respect of FIG. 6A. However, in the embodiment shown in FIG. 6B, the second terminal of the SPAD 604 is coupled to an input of an amplifier 614 (e.g. a transimpedance amplifier). As shown in FIG. 6B, the input of the amplifier 614 is further coupled to a plurality of other SPADS 604 and resistive elements 608 via branches 616. It is noted that each of the SPADs 604 depicted in FIG. 6B produces a discrete charge packet 618 for each photon detected. As such, the analog current generated by each of the SPADs 604 depicted in FIG. 6B may be proportional to the number of photons detected. In the arrangement of FIG. 6B, analog current from the branch 617 and from each of the branches 616 are summed at node 619 (by Kirchhoff's law), and the analog sum is provided as an input to the amplifier 614. As mentioned above, the amplifier 614 may be a transimpedance amplifier. As such, the analog sum provided to the input of the amplifier 614 is output as an analog voltage that is proportional to the number of photons detected by the branches 616 and 617. In the example shown in FIG. 6B, the analog voltage output 620 depicts outputs for both a single photon detected and for two photons detected to illustratively show that the analog voltage output 620 is proportional to the number of photons detected by the branches 616 and 617. The analog voltage output 620 in FIG. 6B is depicted as top-hat pulses. However, in reality, the response of the SPAD 604 to a photon may exhibit non-symmetrical rise times and fall times similar to that shown in curve 609 of FIG. 6A. This is shown in greater detail in FIG. 7 described below.

Figure 7:
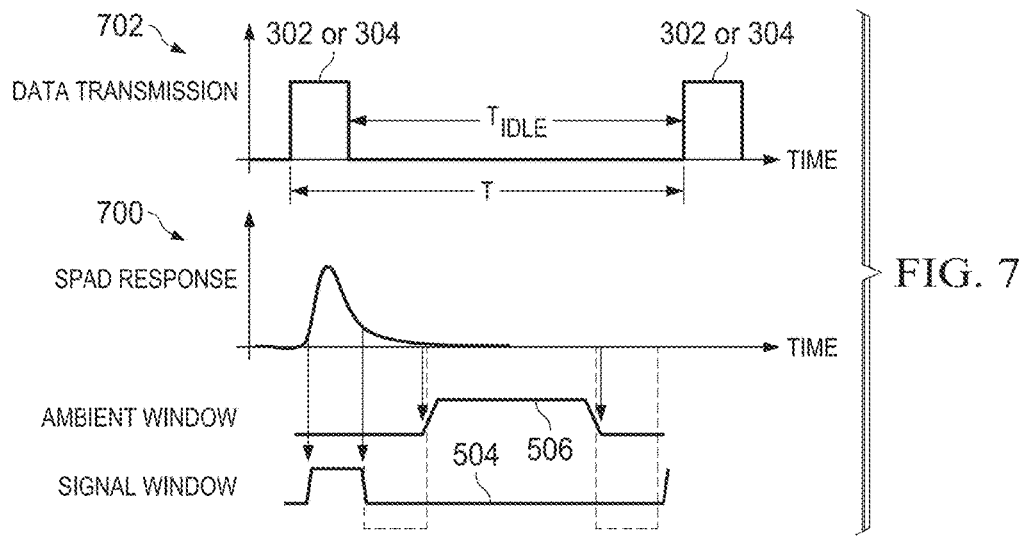
FIG. 7 shows an example of a response of an SPAD to a near-infrared (NIR) photon, in accordance with an embodiment.

FIG. 7 shows an example of a response 700 of the SPAD 604 to a near-infrared (NIR) photon, in accordance with an embodiment. The NIR photon may be transmitted to the receiver 104 using the short duty cycle pulse train 702 generated by the optical source 102a of the transmitter 102.

As shown in FIG. 7, the SPAD 604 has a jitter tail in its timing response to photons from a range of wavelengths (e.g. NIR). As such, at the receiver 104, in order to preserve the data signal of the PAM modulated pulses 302 or 304 of the short duty cycle pulse train 702, the signal window 504 is aligned to the main lobe of the response 700. Also seen in FIG. 7 is the ambient window 506, which is timed to gate off the jitter tail in the SPAD response 700. This can ensure that the contribution from the jitter tail is minimized, thereby leading to an accurate determination of the contribution of ambient noise at the receiver 104.

Figure 8:
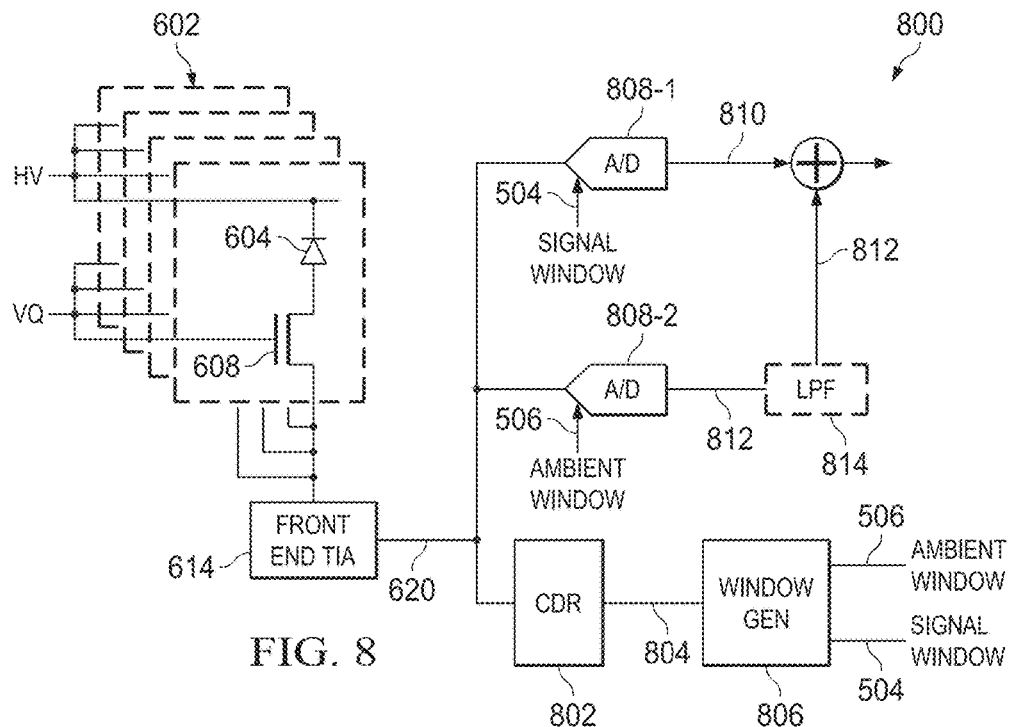
FIG. 8 shows a block diagram of a receiver implementation, in accordance with an embodiment.

FIG. 8 shows a block diagram of a receiver implementation 800, in accordance with an embodiment. The receiver implementation 800 includes a plurality of SPAD optical detectors 602 that produce an analog output. As discussed above in relation to FIG. 6B, the resistive element 608 of each SPAD optical detector 602 is implemented using CMOS technology. Furthermore, the analog currents from each branch of the plurality of SPAD optical detectors 602 is summed and provided as an input to the amplifier 614, which in the example of FIG. 8 is a front end transimpedance amplifier. The analog voltage output 620 is provided to a CDR module 802 that is configured to produce a recovered clock signal 804 based, at least in part, on the analog voltage output 620 of the amplifier 614. The CDR module 802 may be implemented using CDR circuits known in the art. Additionally, the recovered clock signal 804 may be used by a window generation module 806 to generate the above-described signal windows 504 and ambient windows 506.

Figure 13:
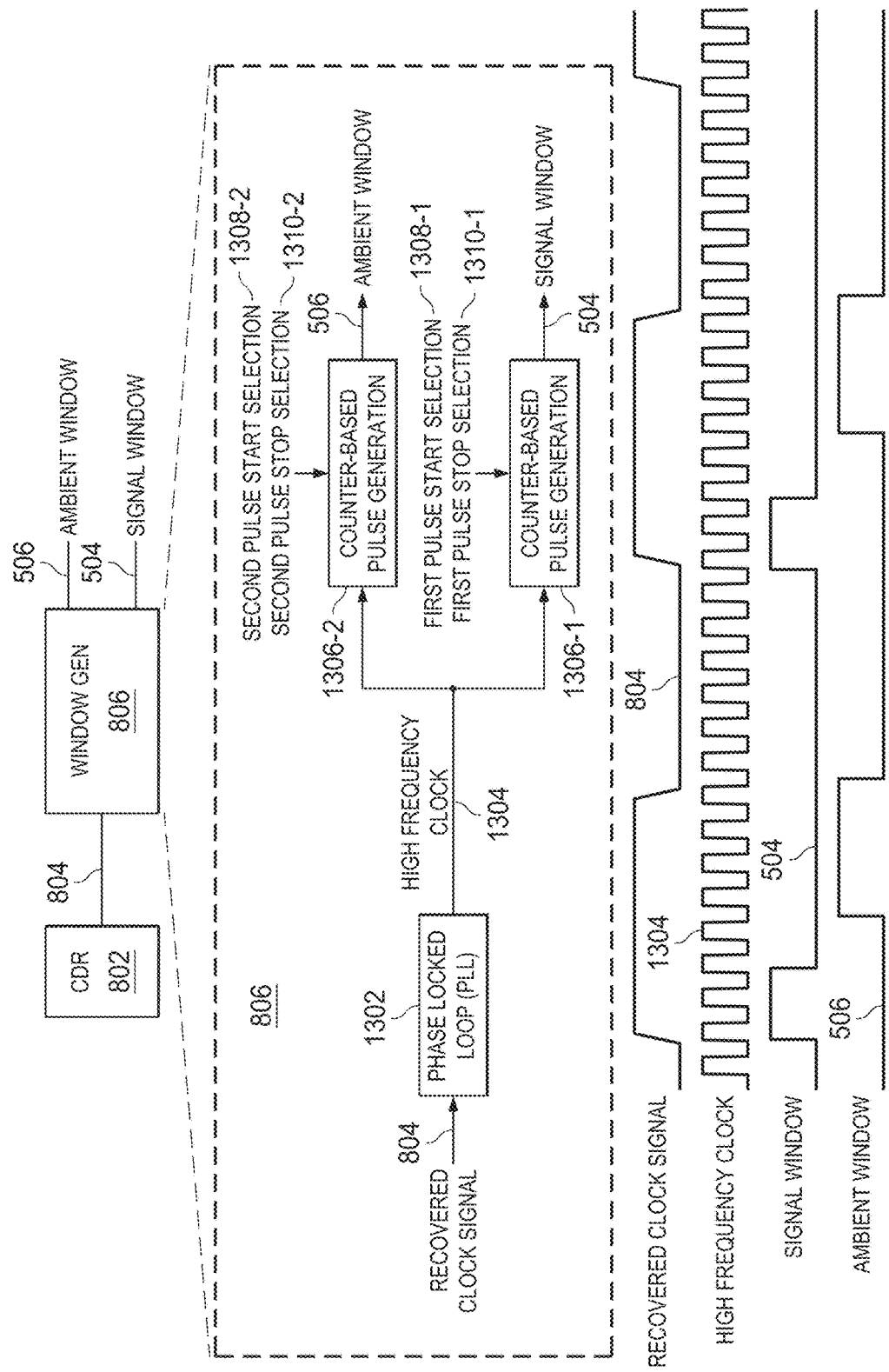
FIG. 13 shows a window generation circuit implemented by a phase-locked loop and digital synchronous logic, in accordance with an embodiment.

FIG. 13 shows the window generation module 806 implemented by a phase-locked loop (PLL) 1302 and digital synchronous logic, in accordance with an embodiment. As shown in FIG. 13, the window generation module 806 includes the PLL 1302 that receives the recovered clock signal 804 and generates a high frequency clock 1304 having a higher frequency than the recovered clock signal 804. The high frequency clock 1304 is provided to a first pulse generation module 1306-1 and a second pulse generation module 1306-2. The first pulse generation module 1306-1 is configured to generate the signal window 504 using a digital counter that may be controlled, at least in part, by a first pulse start selection signal 1308-1 and a first pulse stop selection signal 1310-1 provided to the first pulse generation module 1306-1. Similarly, the second pulse generation module 1306-2 is configured to generate the ambient window 506 using a digital counter that may be controlled, at least in part, by a second pulse start selection signal 1308-2 and a second pulse stop selection signal 1310-2 provided to the second pulse generation module 1306-2. In essence, the embodiment of window generation module 806 shown in FIG. 13 creates a high frequency digital clock and subsequently uses a finite state machine with digital counter to create the window pulses 504 and 506.

Figure 14:
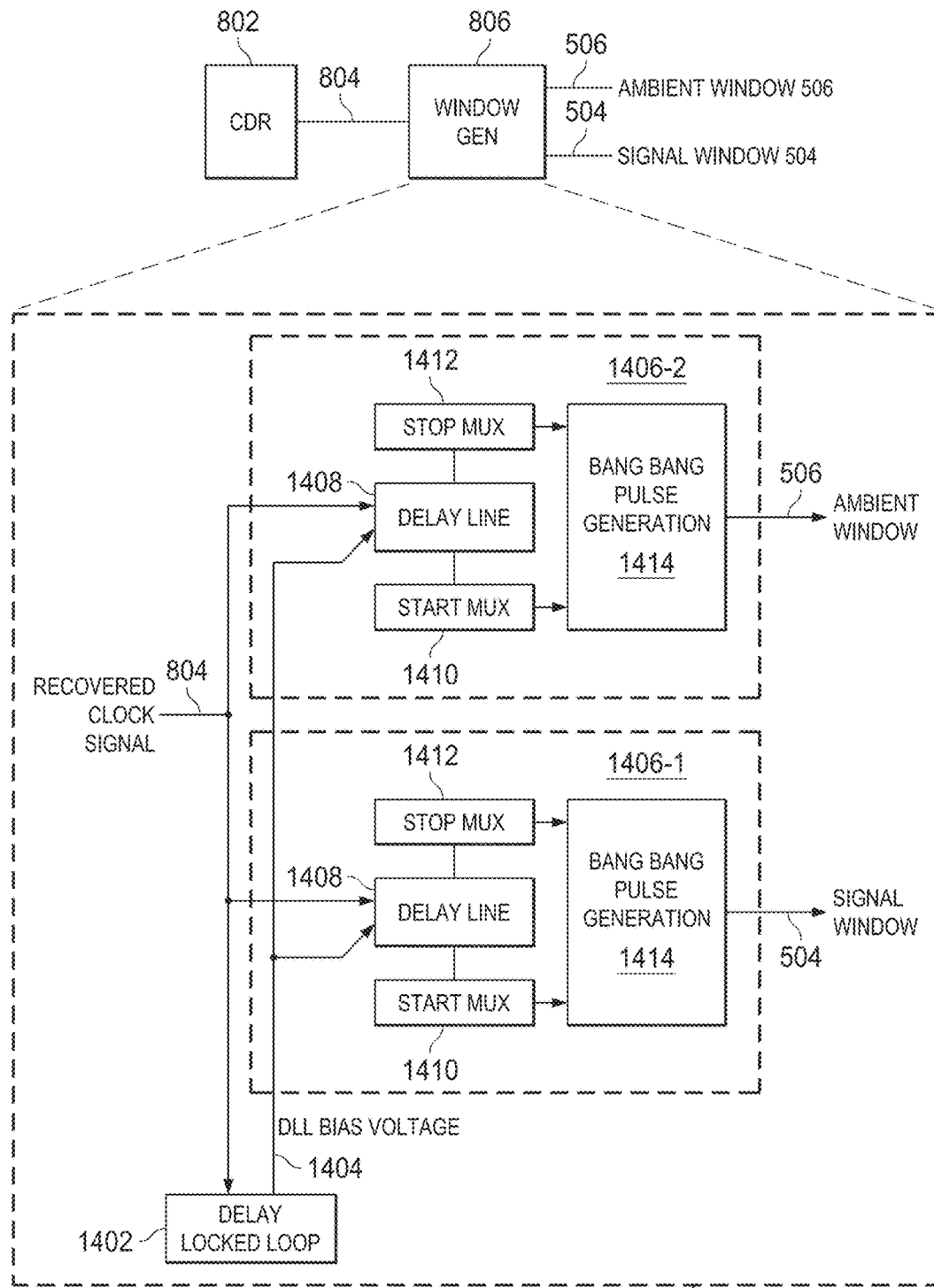
FIG. 14 shows a window generation circuit implemented by a delay-locked loop and analog asynchronous logic, in accordance with another embodiment.
Figure 15:
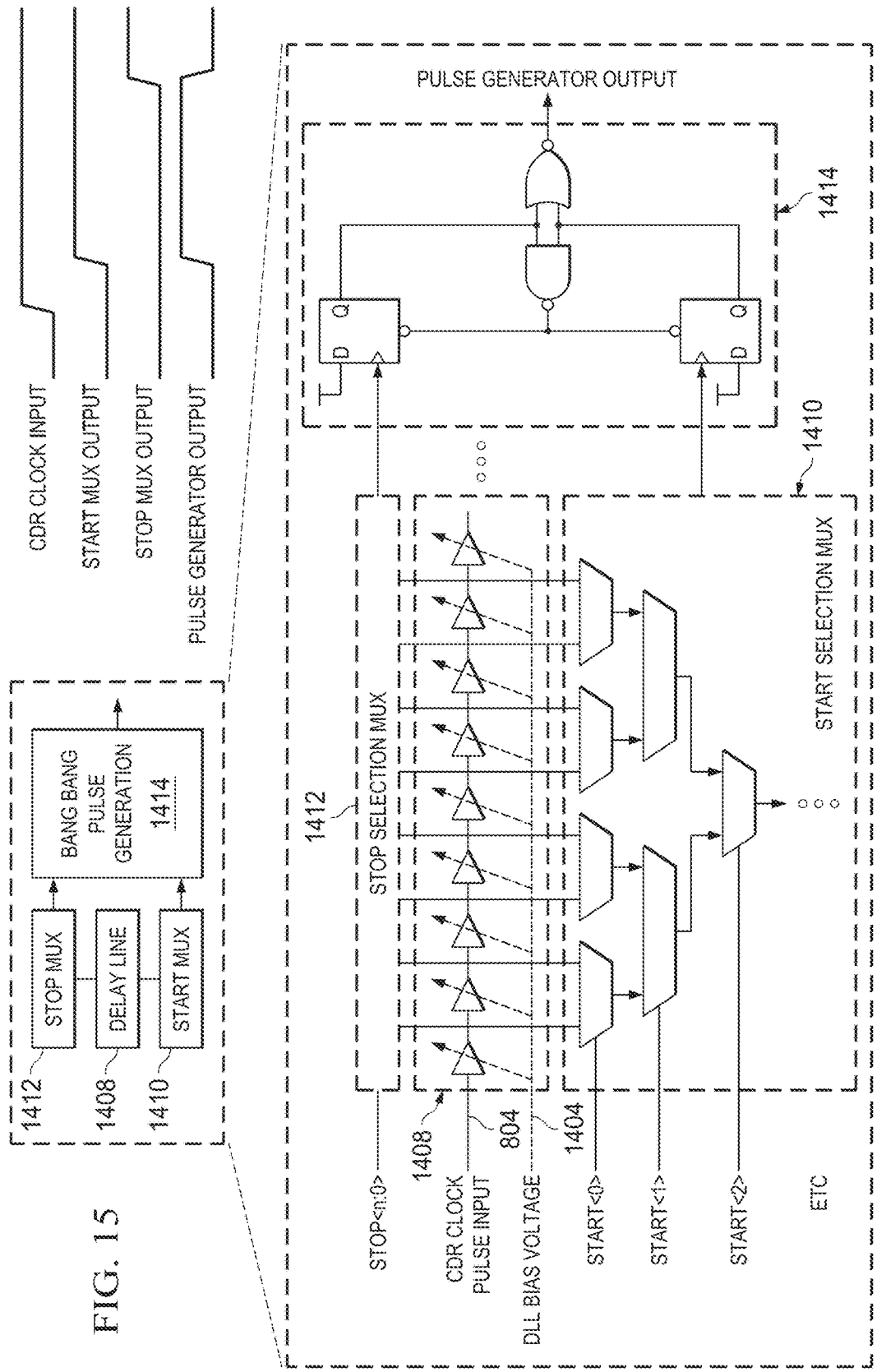
FIG. 15 schematically shows an implementation of the analog asynchronous logic shown in FIG. 14, in accordance with an embodiment.

FIG. 14 shows the window generation module 806 implemented by a delay-locked loop (DLL) 1402 and analog asynchronous logic 1406-1, 1406-2, in accordance with another embodiment. As shown in FIG. 14, the window generation module 806 includes the DLL 1402 that receives the recovered clock signal 804 and generates a DLL bias voltage 1404 that is provided to a first analog asynchronous module 1406-1 and a second analog asynchronous module 1406-2. As depicted in FIG. 14, each of the analog asynchronous modules 1406-1 and 1406-2 also receives the recovered clock signal 804 as an input. The first analog asynchronous module 1406-1 generates the signal window 504, while the second analog asynchronous module 1406-2 generates the ambient window 506. Each of the analog asynchronous modules 1406-1 and 1406-2 includes a delay line 1408 that receives the recovered clock signal 804 and the DLL bias voltage 1404. Each of the analog asynchronous modules 1406-1 and 1406-2 also includes a start multiplexer 1410 and a stop multiplexer 1412 that are coupled to the delay line 1408. The delay line 1408 generates selection signals provided to both the start multiplexer 1410 and the stop multiplexer 1412. In turn, the multiplexers 1410 and 1412 provide a clock signal to components of a bang-bang pulse generator 1414 coupled to both multiplexers 1410 and 1412. FIG. 15 schematically shows an implementation of the analog asynchronous logic 1406-1, 1406-2 shown in FIG. 14, in accordance with an embodiment. In essence, the embodiments shown in FIG. 14 and FIG. 15 use a delay line with selectable outputs to feed the bang-bang pulse generator 1414, which is used in current PLL circuits.

Referring back to FIG. 8, the signal windows 504 generated by the window generation module 806 are provided to a first ADC 808-1 that samples and holds the analog voltage output 620 during each of the signal windows 504. The first ADC 808-1 also converts the analog values sampled during these time periods to digital signal data 810. Similarly, the ambient windows 506 generated by the window generation module 806 are provided to a second ADC 808-2 that samples and holds the analog voltage output 620 during each of the ambient windows 506. The second ADC 808-2 also converts the analog values sampled during these time periods to digital ambient noise estimate 812. In some embodiments, the digital ambient noise estimate 812 is averaged using an optional low-pass filter 814. Subsequently, the digital ambient noise estimate 812 is subtracted from the digital signal data 810, thereby compensating for the effects of ambient noise on the modulated optical signal transmitted from the transmitter 102 to the receiver 104.

Figure 9:
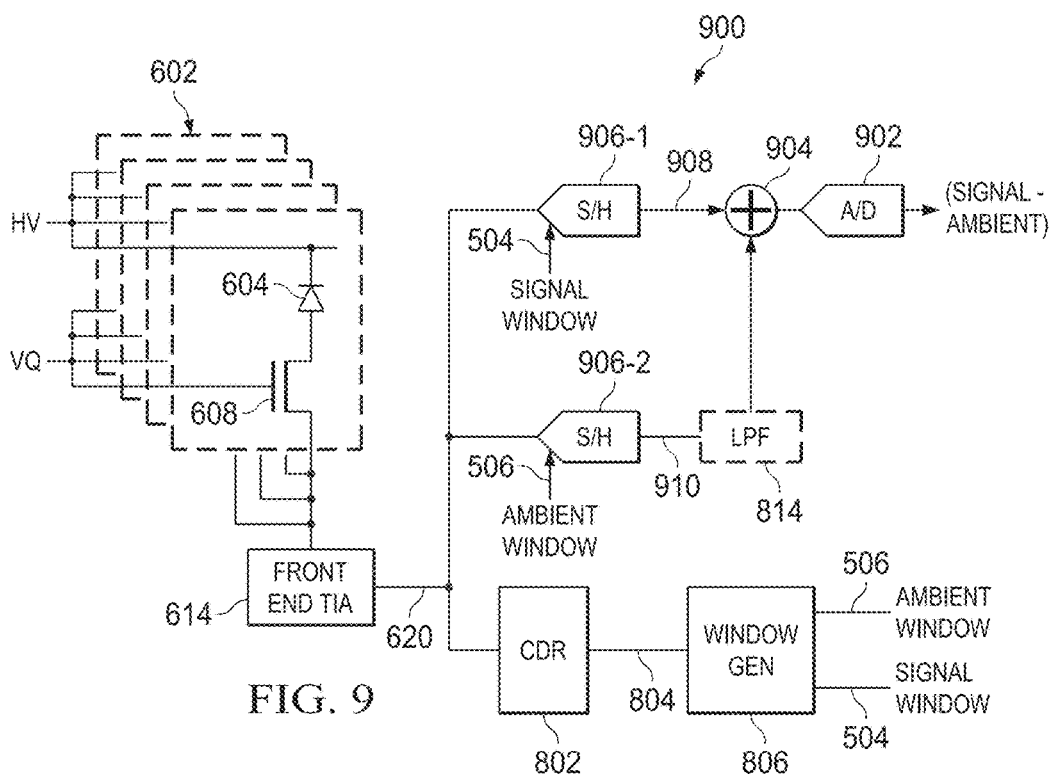
FIG. 9 shows a block diagram of a receiver implementation, in accordance with another embodiment.

FIG. 9 shows a block diagram of a receiver implementation 900, in accordance with another embodiment. Like the receiver implementation 800 in FIG. 8, the receiver implementation 900 includes the plurality of SPAD optical detectors 602 that produces the analog voltage output 620 at the output of the amplifier 614. However, in comparison to the receiver implementation 800, the receiver implementation 900 in FIG. 9 includes a single ADC 902 that converts the output of summer 904 from an analog signal to a digital signal. As such, analog-to-digital conversion is performed after compensating for the effects of ambient noise. As an example, the receiver implementation 900 includes a first sample-and-hold circuit 906-1 that samples and holds the analog voltage output 620 during each of the signal windows 504 to produce analog signal data 908. The receiver implementation 900 also includes a second sample-and-hold circuit 906-1 that samples and holds the analog voltage output 620 during each of the ambient windows 506 to produce analog ambient noise estimate 910. In some embodiments, the analog ambient noise estimate 910 is averaged using the optional low-pass filter 814. Subsequently, the analog ambient noise estimate 910 is subtracted from the analog signal data 908, thereby compensating for the effects of ambient noise on the modulated optical signal transmitted from the transmitter 102 to the receiver 104. The output of the summer 904 is then converted to a digital signal by the ADC 902.

Figure 10:
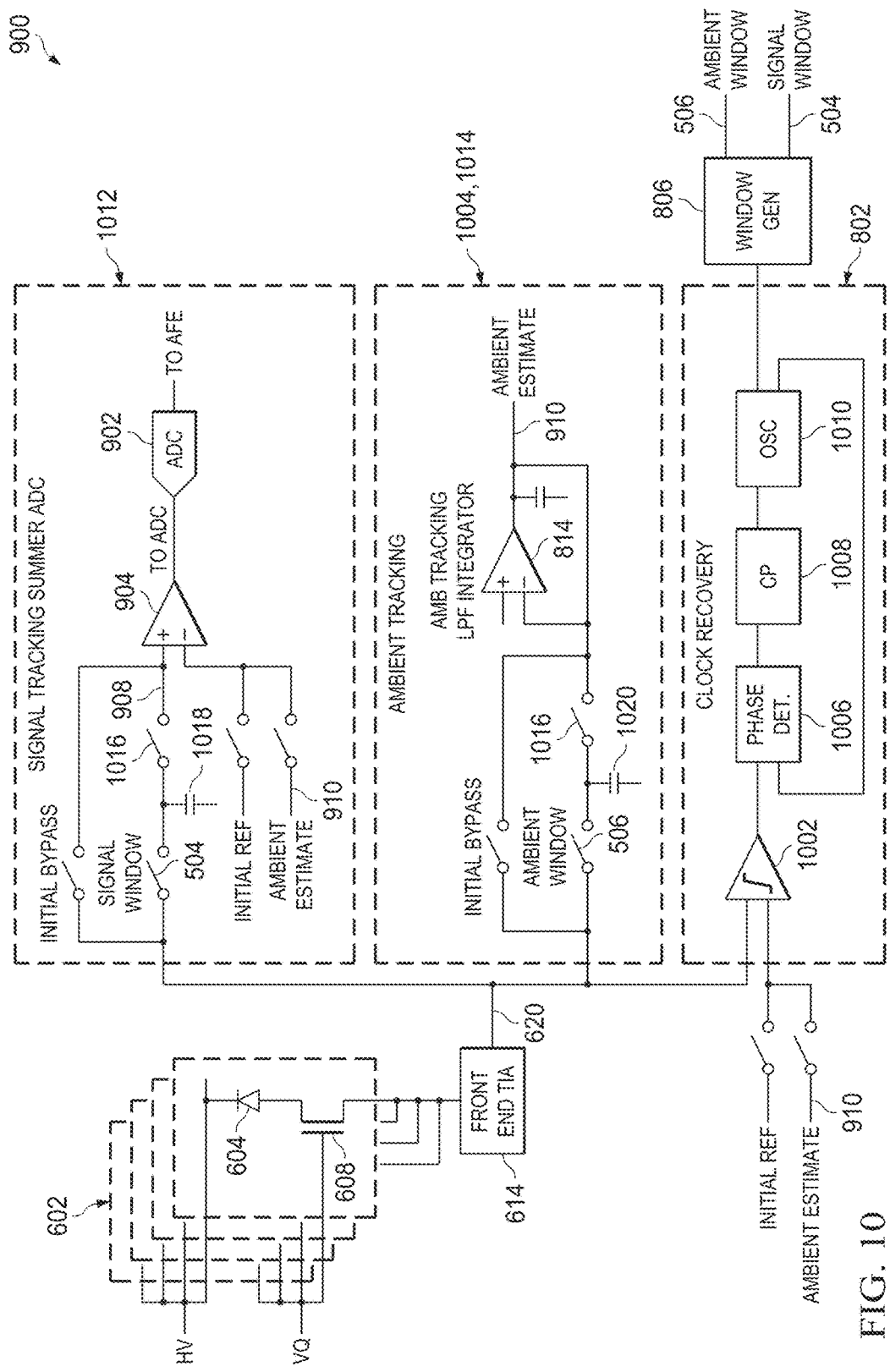
FIG. 10 shows an example of the receiver implementation shown in FIG. 9, in accordance with an embodiment.

FIG. 10 shows an example of the receiver implementation 900 shown in FIG. 9, in accordance with an embodiment. As shown in FIG. 10, the CDR module 802 may include a slicer 1002 configured to compare the analog voltage output 620 at the output of the amplifier 614 against an initial reference when the first portion 302 (e.g. training sequence portion) of the modulated optical signal 300 is received at the receiver 104. However, in response to the receiver 104 receiving the second portion 304 (e.g. the data portion) of the modulated optical signal 300, the slicer 1002 may be configured to compare the analog voltage output 620 against the analog ambient noise estimate 910 obtained by the ambient noise estimation module 1004. The slicer 1002 selects an appropriate PAM symbol value based on the comparison and the selected PAM symbol is provided a feedback loop that includes a phase detector 1006, a charge pump 1008, and an oscillator 1010. The feedback loops generates the recovered clock signal 804, which is then provided to the window generation module 806 that generates the above-described signal windows 504 and ambient windows 506.

The receiver implementation 900 shown in FIG. 10 includes a data detection path 1012 and an ambient noise tracking path 1014. Each of the data detection path 1012 and the ambient noise tracking path 1014 include sample-and-hold circuitry that is implemented by switches. As an example, the data detection path 1012 includes a sample-and-hold switch Sig S/H that is closed in conjunction with the signal windows 504. Similarly, the ambient noise tracking path 1014 includes a sample-and-hold switch Amb S/H that is closed in conjunction with the ambient windows 506. In some embodiments, the sample-and-hold switch Sig S/H may be open when the signal windows 504 are inactive, while the sample-and-hold switch Amb S/H may be open when the ambient windows 506 are inactive. As depicted in FIG. 10, the data detection path 1012 and the ambient noise tracking path 1014 each has an initial bypass switch, which is closed when the first portion 302 (e.g. training sequence portion) of the modulated optical signal 300 is received at the receiver 104. The initial bypass switches are open when the second portion 304 (e.g. data portion) of the modulated optical signal 300 is received at the receiver 104.

As shown in FIG. 10, the data detection path 1012 also includes a switch 1016 that is arranged in series with the sample-and-hold switch Sig S/H. The sample-and-hold switch Sig S/H is closed in conjunction with the signal windows 504. As such, the sample-and-hold switch Sig S/H is closed for a short period of time (e.g. for a time comparable to the product of the duty cycle and the period T, indicated in FIGS. 3 and 4). Consequently, the sample-and-hold switch Sig S/H is driven at a high sampling rate. The signal sampled by the sample-and-hold switch Sig S/H is stored in capacitor 1018. In the absence of the switch 1015, the ADC 902 would need to be driven at a sampling rate that is comparable to the sampling rate of the sample-and-hold switch Sig S/H. However, due to the presence of switch 1016, the ADC sampling rate can be reduced by a factor that is substantially equal to a reciprocal of the duty cycle.

During operation, the signal windows 504 and the ambient windows 506 determined by the window generation module 806 are provided to the data detection path 1012 and the ambient noise tracking path 1014, respectively. When the second portion 304 of the modulated optical signal 300 is received at the receiver 104, the sample-and-hold switch Amb S/H is closed in conjunction with the ambient windows 506 to obtain an estimate of the ambient noise, which is stored in capacitor 1020. The switch 1016 is then closed to provide the voltage across the capacitor 1020 to low-pass filter 814, which subsequently averages the voltage to produce an analog ambient noise estimate 910. Similarly, when the second portion 304 of the modulated optical signal 300 is received at the receiver 104, the sample-and-hold switch Sig S/H is closed in conjunction with the signal windows 504 to obtain the analog signal data 908, which is stored in capacitor 1018. The switch 1016 is then closed to provide the analog signal data 908 stored in the capacitor 1018 to summer 904, which subtracts the analog ambient noise estimate 910 from the analog signal data 908. The output of the summer 904 is subsequently converted by the ADC 902 to a digital signal.

Figure 11:
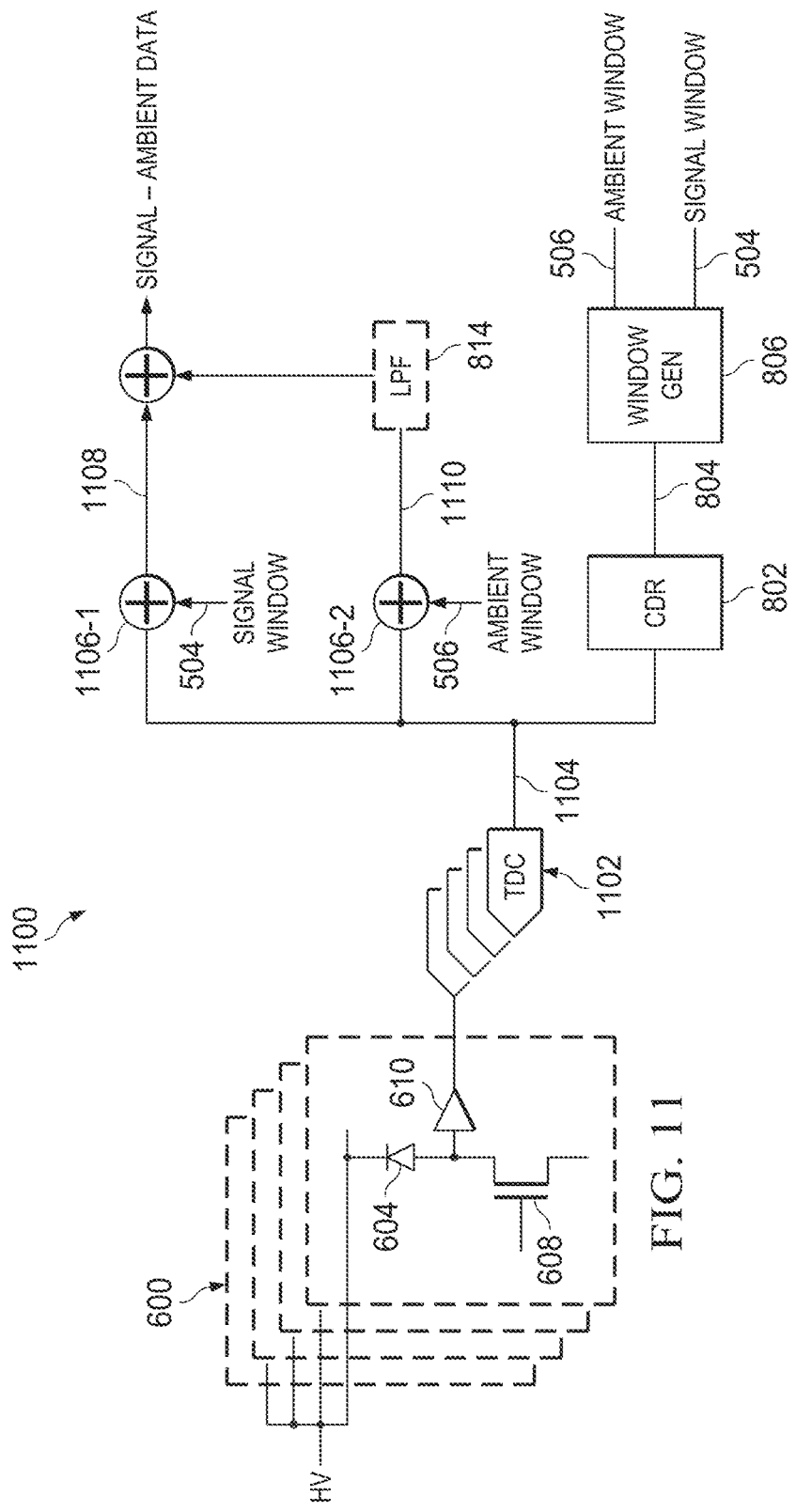
FIG. 11 shows a block diagram of a receiver implementation, in accordance with yet another embodiment.

FIG. 11 shows a block diagram of a receiver implementation 1100, in accordance with an embodiment. The receiver implementation 1100 includes a plurality of SPAD optical detectors 600 that produce a digital output at the output of the amplifier 610. As shown in FIG. 11, the digital output of each SPAD optical detector 600 is input to a time-to-digital convertor 1102 to produce a digital signal 1104. In this embodiment, the CDR module 802 may be a digital implementation or an analog implementation that is independent of the main signal chain. The CDR module 802 produces the recovered clock signal 804 that may be used by the window generation module 806 to generate the above-described signal windows 504 and ambient windows 506.

The signal windows 504 generated by the window generation module 806 are provided to a first digital summer 1106-1 that sums the digital signal 1104 for each of the SPAD optical detectors 600 during the signal windows 504 to produce digital signal data 1108. Similarly, the ambient windows 506 generated by the window generation module 806 are provided to a second digital summer 1106-2 that sums the digital signal 1104 for each of the SPAD optical detectors 600 during the ambient windows 506 to produce a digital ambient noise estimate 1110. In some embodiments, the digital ambient noise estimate 1110 is averaged using an optional low-pass filter 814. Subsequently, the digital ambient noise estimate 1110 is subtracted from the digital signal data 1108, thereby compensating for the effects of ambient noise on the modulated optical signal transmitted from the transmitter 102 to the receiver 104.

Figure 12:
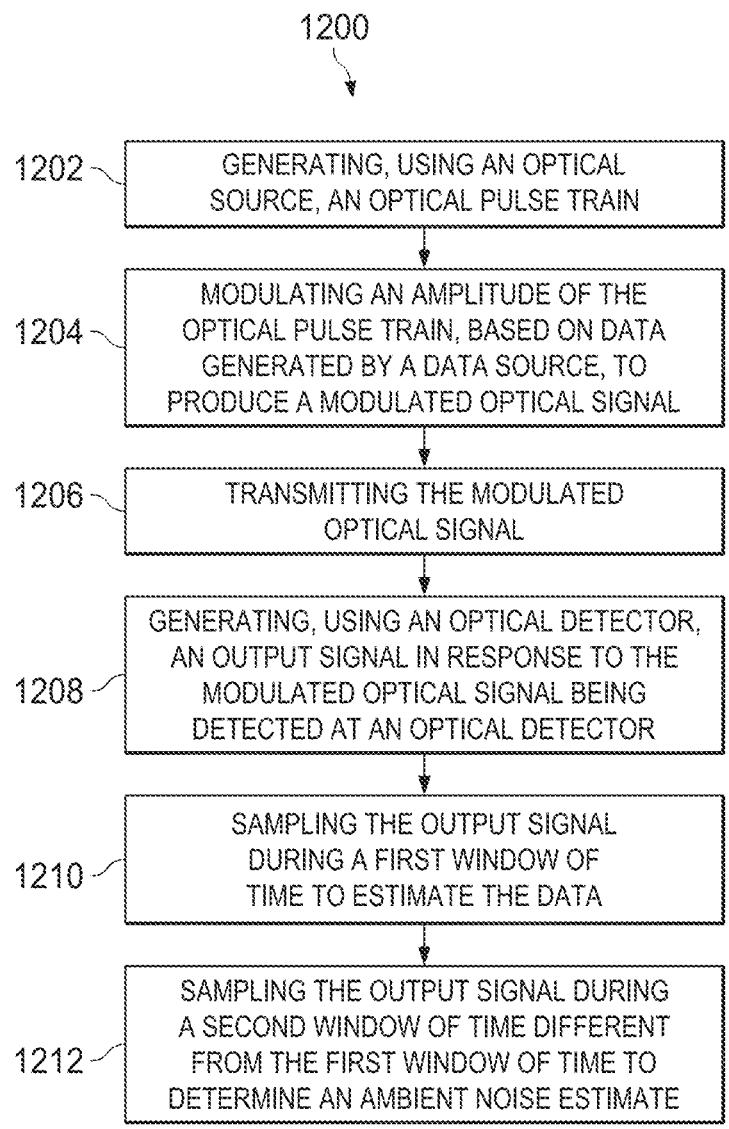
FIG. 12 shows a method for transmitting and receiving in an optical communications system, in accordance with an embodiment.

FIG. 12 shows a method 1200 for transmitting and receiving in the optical communications system 100, in accordance with an embodiment. The method 1200 may include generating, using the optical source 102a, an optical pulse train (in 1202); modulating an amplitude of the optical pulse train, based on data generated by a data source, to produce a modulated optical signal (in 1204); and transmitting the modulated optical signal (in 1206). The method also includes generating, using an optical detector, an output signal in response to the modulated optical signal being detected at an optical detector (in 1208); sampling the output signal during a first window of time to estimate the data (in 1210); and sampling the output signal during a second window of time different from the first window of time to determine an ambient noise estimate (in 1212).

In summary, the above-described scheme of generating a short duty cycle pulse train as the optical carrier allows for ideal for clock recovery (e.g. since sharp defined edges are present in the optical carrier). The short duty cycle pulse train also allows for time-windowing in which signal and ambient noise contributions are determined independently and accurately. Furthermore, the short duty cycle pulse train allows for lower ADC conversion rates. Additionally, the short duty cycle pulse train saves SPAD charge pump power (e.g. in embodiments where the optical detector 104a is an SPAD) and VCSEL power (e.g. in embodiments where the optical source 102a is a VCSEL). Other observations that may be made from the proposed transmission and reception scheme is that SPAD pulse current occurs very fast within a short window of time (which is not representative of continuous signals). This feature matches the low duty cycle VCSEL transmission scheme. Additionally, in embodiments where the optical detector 104a outputs a digital signal, the SPAD optical detector allows for direct-to-digital conversion. Furthermore, since photo-diodes are not configured to operate in a mode similar to a VCSEL or an SPAD, it would be difficult for photo-diode receptors to surreptitiously detect data transmitted between the transmitter 102 and the receiver 104, thereby providing an extra degree of security. Also, as described above in relation to FIG. 1, the proposed scheme can be run concurrently with ToF ranging.

In an embodiment, a device includes an optical source configured to generate an optical carrier including an optical pulse train; and a modulator configured to modulate an amplitude of the optical pulse train, based on data generated by a data source, to produce a modulated optical signal.

In an embodiment, a device includes an optical detector configured to generate an output signal in response to a modulated optical signal detected at the optical detector, wherein the modulated optical signal includes an optical pulse train having amplitudes modulated by data. The device further includes a data detection circuit configured to sample the output signal during a first window of time, the data detection circuit being configured to estimate the data. The device additionally includes a noise estimation circuit configured to sample the output signal during a second window of time different from the first window of time, the noise estimation circuit being configured to determine an ambient noise estimate.

In an embodiment, a method includes generating, using an optical source, an optical pulse train; modulating an amplitude of the optical pulse train, based on data generated by a data source, to produce a modulated optical signal; and transmitting the modulated optical signal. The method further includes generating, using an optical detector, an output signal in response to the modulated optical signal being detected at an optical detector; sampling the output signal during a first window of time to estimate the data; and sampling the output signal during a second window of time different from the first window of time to determine an ambient noise estimate.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:
   an optical source configured to generate an optical carrier comprising an optical pulse train;
   a modulator configured to modulate an amplitude of the optical pulse train, based on a modulation scheme and data generated by a data source, to produce a modulated optical signal;
   a transmitter configured to transmit the modulated optical signal over a communication channel;
   an optical detector configured to generate an output signal in response to the modulated optical signal being detected at the optical detector;
   a data detection circuit configured to sample the output signal during a first window of time, the data detection circuit being configured to estimate the data; and
   a noise estimation circuit configured to sample the output signal during a second window of time different from the first window of time, the noise estimation circuit being configured to determine an ambient noise estimate, wherein the first window of time coincides in time with a first pulse of the modulated optical signal, and wherein the second window of time is between a falling edge of the first pulse of the modulated optical signal and a rising edge of a second pulse of the modulated optical signal, the first pulse and the second pulse being consecutive pulses of the optical pulse train.

2. The system of claim 1, wherein the modulator is configured to modulate the amplitude of the optical pulse train using a pulse amplitude modulation (PAM) scheme.

3. The system of claim 1, wherein the optical source comprises a vertical-cavity surface-emitting laser (VCSEL).

4. The system of claim 1, wherein a period of the optical pulse train is less than or equal to about 10 nanoseconds.

5. The system of claim 1, wherein a duty cycle of the optical pulse train is less than about 10 percent.

6. The system of claim 1, wherein the modulated optical signal comprises a first portion and a second portion, wherein an amplitude of each pulse in the first portion of the modulated optical signal is equal to a maximum amplitude of the modulation scheme, and wherein an amplitude of each pulse in the second portion of the modulated optical signal is modulated based on the data generated by the data source.

7. The system of claim 6, wherein a minimum amplitude of pulses in the second portion of the modulated optical signal is greater than a maximum amplitude of ambient noise present in the communication channel.

8. The system of claim 1, wherein the second window of time and the first window of time are non-overlapping windows of time.

9. A method, comprising:
   generating, using an optical source, an optical pulse train;
   modulating an amplitude of the optical pulse train, based on data generated by a data source, to produce a modulated optical signal;
   transmitting the modulated optical signal over a communication channel;
   generating, using an optical detector, an output signal in response to the modulated optical signal being detected at an optical detector;
   sampling the output signal during a first window of time to estimate the data; and
   sampling the output signal during a second window of time different from the first window of time to determine an ambient noise estimate.

10. The method of claim 9, wherein modulating the amplitude of the optical pulse train comprises using a pulse amplitude modulation (PAM) scheme to modulate the amplitude of the optical pulse train.

11. The method of claim 9, wherein the optical source comprises at least one of a laser diode or a light-emitting diode.

12. The method of claim 9, wherein a period of the optical pulse train is less than or equal to about 10 nanoseconds.

13. The method of claim 9, wherein a duty cycle of the optical pulse train is less than about 10 percent.

14. The method of claim 9, wherein the optical detector comprises at least one of a single-photon avalanche diode (SPAD) or an avalanche photo diode.

15. The method of claim 9, wherein the first window of time and the second window of time are non-overlapping in time.

16. A system, comprising:
   an optical source configured to generate an optical carrier comprising an optical pulse train;
   a modulator configured to modulate an amplitude of the optical pulse train, based on a modulation scheme and data generated by a data source, to produce a modulated optical signal, wherein the modulated optical signal comprises a first portion and a second portion, wherein an amplitude of each pulse in the first portion of the modulated optical signal is equal to a maximum amplitude of the modulation scheme, and wherein an amplitude of each pulse in the second portion of the modulated optical signal is modulated based on the data generated by the data source;
   a transmitter configured to transmit the modulated optical signal over a communication channel;
   an optical detector configured to generate an output signal in response to the modulated optical signal being detected at the optical detector;

a data detection circuit coupled to an output of the optical detector, the data detection circuit being configured to sample the output signal during a signal detection window and to estimate the data;

a noise estimation circuit coupled to the output of the optical detector and in parallel to the data detection circuit, the noise estimation circuit being configured to sample the output signal during an ambient estimation window and to determine an ambient noise estimate;

a clock recovery circuit coupled to the output of the optical detector and in parallel to the data detection circuit and the noise estimation circuit, the clock recovery circuit being configured to generate a recovered clock signal generated based on the output signal; and a window generation circuit coupled to an output of the clock recovery circuit, the window generation circuit being configured to generate the signal detection window and the ambient estimation window based on the recovered clock signal such that the signal detection window and the ambient estimation window are non-overlapping in time.

17. The system of claim 16, wherein a minimum amplitude of pulses in the second portion of the modulated optical signal is greater than a maximum amplitude of ambient noise present in the communication channel.

18. The system of claim 16, wherein a period of the optical pulse train is less than or equal to about 10 nanoseconds.

19. The system of claim 16, wherein a duty cycle of the optical pulse train is less than about 10 percent.

20. The system of claim 16, wherein the modulator is configured to modulate the amplitude of the optical pulse train using a pulse amplitude modulation (PAM) scheme.

* * * * *